United States Patent [19]

Kano et al.

[11] Patent Number: 4,794,312
[45] Date of Patent: Dec. 27, 1988

[54] METHOD AND APPARATUS FOR CONTROLLING A SERVO MOTOR

[75] Inventors: Minoru Kano, Ibaraki; Kenzo Takeichi, Tochigi; Minoru Makita, Tochigi; Ryoichi Hisatomi, Tochigi; Akinobu Takemoto, Oyama, all of Japan

[73] Assignee: Hitachi, Ltd., Tokyo, Japan

[21] Appl. No.: 101,443

[22] Filed: Sep. 28, 1987

[30] Foreign Application Priority Data

Sep. 29, 1986 [JP] Japan .................. 61-228178
Nov. 28, 1986 [JP] Japan .................. 61-281703

[51] Int. Cl.$^4$ ............................ G05B 11/28
[52] U.S. Cl. ..................... 318/599; 318/341; 318/681; 363/41
[58] Field of Search ............. 318/599, 681, 341; 363/41, 65

[56] References Cited

U.S. PATENT DOCUMENTS

| 4,290,101 | 9/1981 | Herzenhan | 363/65 |
| 4,388,570 | 6/1983 | Sangree | 318/255 |
| 4,514,666 | 4/1985 | Suzuki | 318/293 |
| 4,523,134 | 6/1985 | Kinoshita | 318/313 |

OTHER PUBLICATIONS

"Design and Analysis of Pulse-Width Modulated Amplifiers for DC Servo Systems" Jacob Tal, IEEE Trans. on Industrial Electronics and Control Instrumentation, IECI-23, Feb. 1976, p. 47.

Primary Examiner—William M Shoop, Jr.
Assistant Examiner—Saul M. Bergmann
Attorney, Agent, or Firm—Antonelli, Terry & Wands

[57] ABSTRACT

A servo motor control system for accurately pointing and controlling the speed of a servo motor using a low resolution PWM signal. A PWM command value given in each control operation cycle for driving other servo motors is divided, and output to a power control device operating signal generation circuit.

10 Claims, 6 Drawing Sheets

FIG. I

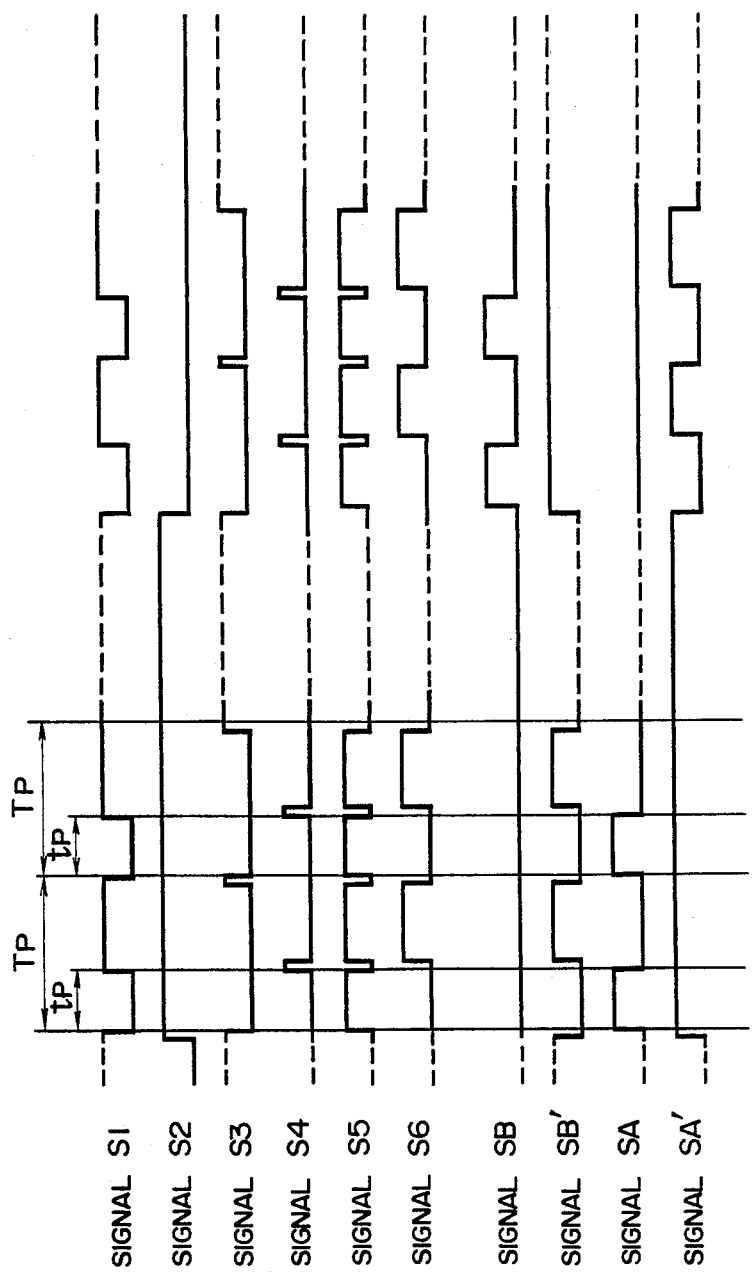

METHOD AND APPARATUS FOR CONTROLLING A SERVO MOTOR

BACKGROUND OF THE INVENTION

1. Field of the Invention

This invention relates to a method and apparatus for servo motor drive control for high-accuracy positioning of a servo system such as an industrial robot.

2. Description of the Prior Art

A conventional servo motor control is described in an article entitled "Design and Analysis of Pulse-width-Modulated Amplifiers for DC Servo Systems" by Jacobtal, IEEE Transaction on Electronics and Control Instrumentation, Vol. IECI-23, No. 1, February 1976. Generally, a d.c. motor servo system has a motor driver stage as shown in FIG. 8. The driver stage consists of a pair of power control devices A and A' and another pair of power control devices B and B', the devices being typically bipolar transistors or FETs. Devices A and B have their collectors connected to the positive terminal of a servo motor power supply 12 and their emitters connected to the collectors of the devices B' and A respectively, with the emitters thereof connected to the negative terminal of the power supply 12 through a current detecting resistor $R_I$. Each of the devices A and B is shunted between the collector and emitter terminals by flyback diodes $A_D$ and $B_D$, respectively, which are polarized oppositely with respect to the emitter-collector junction. Similarly, the devices B' and A' have their collector terminals connected through opposite-polarized flyback diodes $B_D'$ and $A_D'$, respectively, to the negative terminals of the power supply 12. A d.c. servo motor 14, with its winding inductance and resistance represented by $L_M$ and $R_M$, is connected between the emitter terminals of the power control devices A and B. This driver stage configuration in which two pairs of series-connected power control devices A—A' and B—B' are connected in parallel across a power source, with a d.c. servo motor 14 being connected between the node of A and B' and the node of B and A', is called "H-bridge" configuration. The four power control devices A, B, A' and B' in the H-bridge configuration have their base terminals supplied with input signals in pulse-width modulation (will be termed simply "PWM") from a servo control stage, and the current conduction to the d.c. servo motor 14 is controlled.

In the conventional d.c. servo motor drive control system, the device input signals are switched such that devices A and A' or devices B and B' are activated during the active cycle of the PWM signal, and the devices A and B are deactivated and the devices A' and B' are activated during the inactive cycle of the PWM signal. With the PWM signal having an active time length of $t_p$ and a PWM period of $T_p$, the average application voltage $V_M$ to the servo motor 14 is given by the ordinary direct current theory as follows.

$$V_M \approx V \cdot t_p / T_p \quad (1)$$

Examples of this type of d.c. motor drive circuit are disclosed in U.S. Pat. Nos. 4,388,570 and 4,523,134.

When high-accuracy positioning control is intended using a d.c. servo motor, the PWM signal needs to have an enhanced resolution as implied by the above formula (1). Namely, the PWM signal must have a very small minimum unit of active time length $t_p$. On this account, it is necessary for the conventional servo motor drive control system intended for high-accuracy positioning control to have a large-scale circuitry for the PWM signal generation thereby to accomplish a fine resolution of the active time length $t_p$, which is accompanied by circuitries for preventing erroneous operation and oscillation, resulting in an increased manufacturing cost. Moreover, the required PWM resolution will not be attained in some cases due to the limited response of the power control device and overall circuit.

SUMMARY OF THE INVENTION

An object of this invention is to provide a method and apparatus for controlling a servo motor capable of high-accuracy position and speed control without the need of high resolution of the PWM signal.

In order to achieve the above objective, the inventive servo motor control apparatus features the arrangement including a motor drive stage having power control devices, a device operating signal generation circuit which generates a pulse-width modulation signal for controlling the power control devices in pulse-width modulation mode and a control command device which provides a pulse-width modulation command value for the device operating signal generation circuit, wherein the control command device includes a circuit for transforming a pulse-width modulation command value evaluated in each control operation cycle into a set of pulse-width modulation commands and a circuit for delivering the command values of the command set sequentially to the device operating signal generation circuit.

The inventive servo motor control method features the operating steps which include evaluating the pulse-width modulation command value in each control operation cycle, transforming the pulse-width modulation command value into a set of pulse-width modulation commands, and delivering the divided pulse-width modulation command values at a certain interval to a device operating signal generation circuit which produces pulse-width modulation signals for controlling in pulse-width modulation mode the motor driving power control devices.

BRIEF DESCRIPTION OF THE DRAWINGS

FIG. 10 is a timing chart showing the operation of the power control device operating signal generation circuit.

DESCRIPTION OF THE PREFERRED EMBODIMENT

Figure 1:
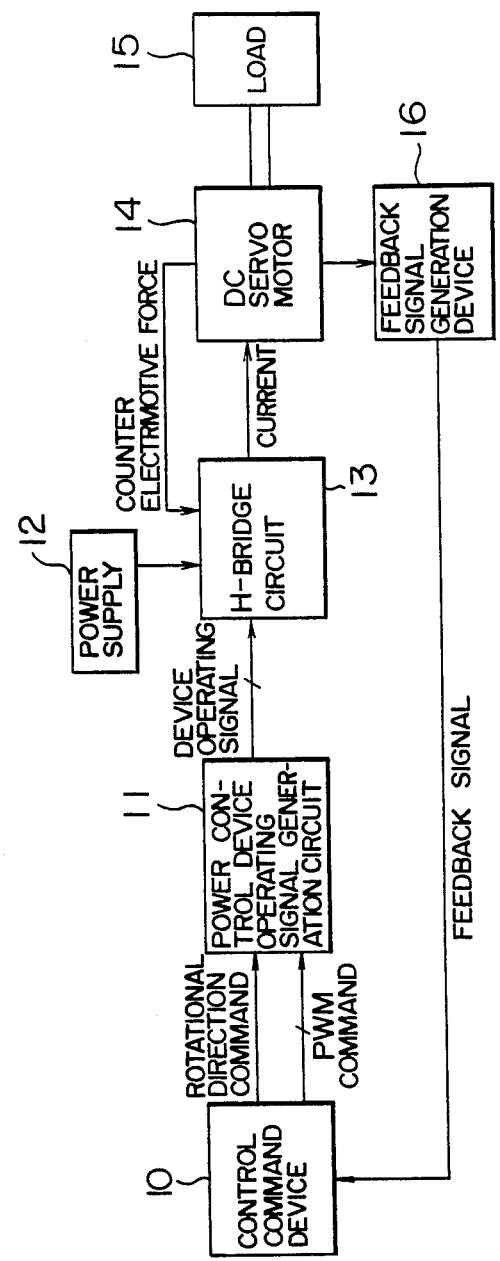
FIG. 1 is a block diagram of the servo motor control system to which the inventive method is applied.

An embodiment of this invention will now be described with reference to the drawings. In FIG. 1 showing the arrangement of the d.c. servo motor control system to which the present invention is applied, a control command circuit 10 issues various commands to a power control device operating signal generation circuit 11 in accordance with the operational instructions given by a high-ranking controller such as a manual command unit (not shown) so as to control the operation of a servo motor 14. The control command device 10 is normally implemented by utilization of a logical operation unit such as a microprocessor, or alternatively it can be arranged in a custom LSI or an analog-digital hybrid integrated circuit.

The power control device operating signal generation circuit 11 is a product of the known circuit technology, and it generates the PWM signal with a certain period $T_p$ in accordance with the command issued at a certain interval $T_S$ by the control command device 10 and supplies the signal to a H-bridge circuit 13.

The H-bridge circuit 13, which is configured as will be explained in FIG. 8, has a connection to a power supply 12 and controls the current conduction to the d.c. servo motor 14 in accordance with the PWM signal. The servo motor 14 has its output shaft coupled to a load 15.

Indicated by 16 is a feedback signal generation device for detecting the angular position of the servo motor, normally consists of an encoder coupled directly to the output shaft of the servo motor 14, a motor rotational direction discrimination circuit which operates in response to the encoder output signal, and a pulse count circuit which counts the encoder output signal. The position detection device may include a well-known resolver or potentiometer, in which case a pertinent position conversion circuit is incorporated in the device 16. The feedback signal generation device 16 may further incorporate a tachometer generator coupled directly to the servo motor and a signal processing circuit, thereby adding the motor speed signal to the feedback signals.

Next, the operation of the above arrangement will be described. The control command device 10 receives the signals representing the operational states of the motor from the feedback signal generation device 16, compares the signals with the reference signals representing the desired operational states, and produces PWM command and rotational direction command for causing the servo motor 14 to operate as desired. The power control device operating signal generation circuit 11 responds to the commands from the control command device 10 to produce device operating signals. Specifically, PWM pulse signals are produced in accordance with the PWM command, and during the active period of the PWM pulse signal the device operating signal generation circuit 11 produces signals for activating the power control devices A and A' or devices B and B' shown in FIG. 4 depending on the rotational direction command. During the inactive period of the PWM pulse signal, the power control devices A and B are deactivated and devices A' and B' are activated.

The power control devices in the H-bridge circuit 13 operate in response to the device operating signals provided by the device operating signal generation circuit 11, as described above, and deliver power from the power supply 12 to the d.c. servo motor 14 in opposition to the counter electromotive force generated by the motor 14. The servo motor 14 coupled with the load 15 makes a dynamic or static operation by consuming the supplied power. The operational states of the servo motor 14 are detected by the feedback signal generation device 16, and the signals are fed back to the control command means 10. In this manner, the control command device 10 causes the load 15 to have the intended behavior through the d.c. servo motor 14.

Figure 2:
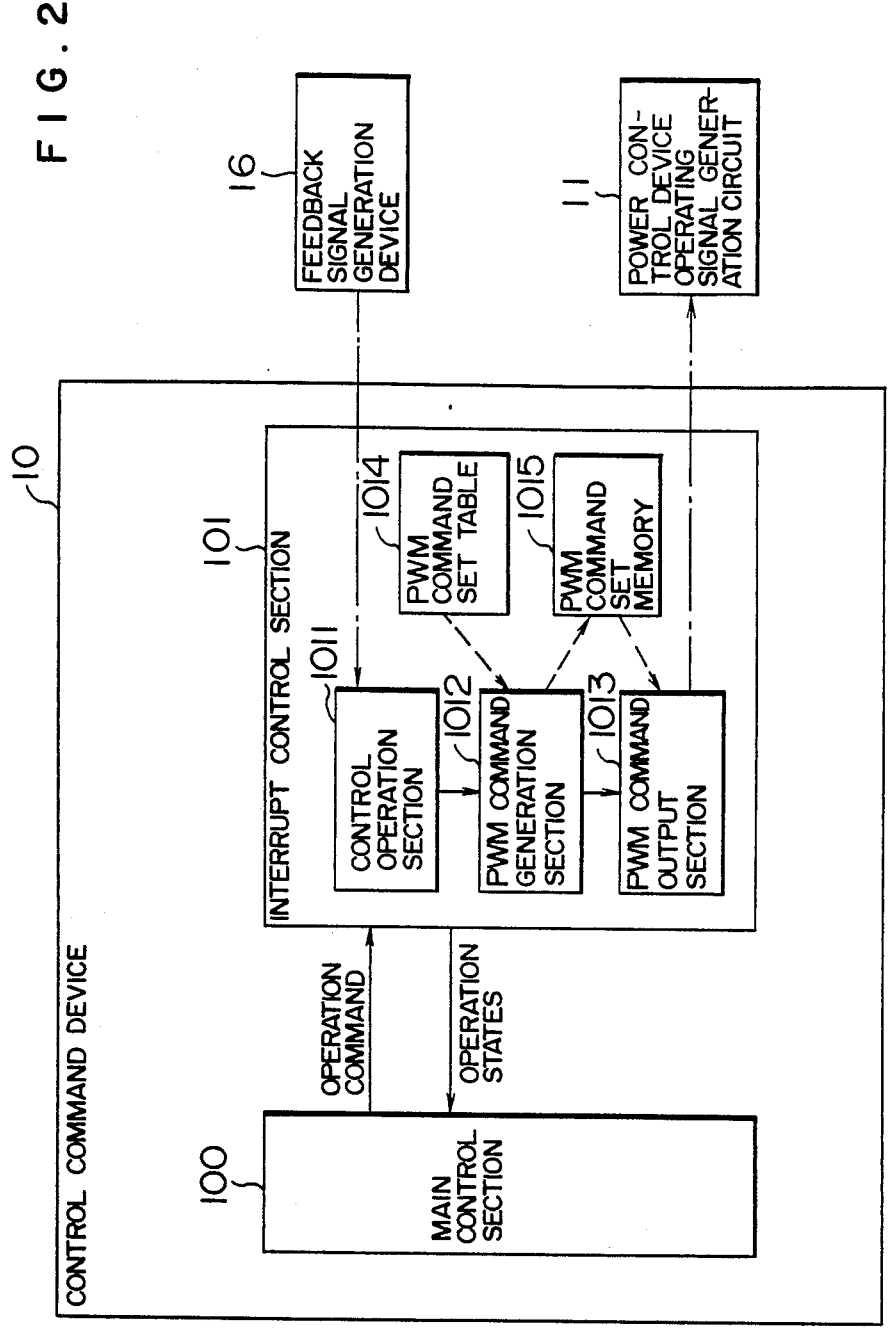
FIG. 2 is a block diagram showing the control command means in the system.

Next, the arrangement and operation of the control command device 10 will be described in further detail with reference to FIG. 2. In this embodiment, the control command device 10 is a logical operation device, specifically it is a microcomputer, with its control logics being implemented by a stored program (software). The control command device 10 is made up of a main control section 100 and an interrupt control section 101 as shown in FIG. 2. The interrupt control section 101 consists of a control operation section 1011, a PWM command generation section 1012, a PWM command output section 1013, a PWM command set table 1014 and a PWM command set memory 1015. The main control section 100 is instructed by the manual command unit or high-ranking controller (not shown) to issue the operational command and data, such as the intended or desired position and speed for the operation of the servo motor to the interrupt controller 101. The interrupt control section 101 is actually an interrupt program which is initiated at a certain interval $T_S$ in response to the reference timing signal from the internal timer of the microcomputer or from the outside, and it is designed to execute the operation instructed by the main control section 100.

Specifically, the control operation section 1011 sets the target operational values at the current time point in response to the operational command from the main control unit 100, compares the feedback signals provided by the feedback signal generation device 16 with the setup values, and calculates the PWM value for operating the servo motor 14 in accordance with predetermined control algorithm. The PWM command generation section 1012 receives the PWM value and makes reference to the PWM command set table 1014 to retrieve a corresponding PWM command set and, after adding the rotational direction command to it, stores the result in the PWM command set memory 1015. An example of intended PWM values and corresponding PWM command sets is as shown in Table 1.

TABLE 1

| Intended PWM value | PWM command set | | | |
|---|---|---|---|---|
| 0.0 | 0 | 0 | 0 | 0 |
| 0.1 | 1 | 0 | 0 | 0 |
| 0.2 | 1 | 1 | 0 | 0 |
| 0.3 | 1 | 1 | 1 | 0 |
| 1.0 | 1 | 1 | 1 | 1 |
| 1.1 | 2 | 1 | 1 | 1 |
| 1.2 | 2 | 2 | 1 | 1 |
| 1.3 | 2 | 2 | 2 | 1 |
| 2.0 | 2 | 2 | 2 | 2 |
| 2.1 | 3 | 2 | 2 | 2 |
| 2.2 | 3 | 3 | 2 | 2 |
| 2.3 | 3 | 3 | 3 | 2 |
| 3.0 | 3 | 3 | 3 | 3 |

In table 1, an intended PWM value has an integer part, which is a PWM signal that the device operating signal generation circuit 11 can produce, i.e., the normalized value derived from $t_p$ in formula (1), and a fractional part for the enhancement of the PWM resolution. The PWM command set table is intended for the 4-fold enhancement of resolution, for the sake of simplicity, and each value in the table represents a PWM signal which would be produced by the device operating signal generation circuit 11, i.e., the normalized value for $t_p$ in formula (1). Value "0" in the table is the PWM command by which the PWM signal is made inactive. Although in this embodiment the table does not include information for the motor rotational direction, a table including the directional information can readily be formed. This table arrangement enables an intended PWM value to address directly a field of PWM command set to be searched, allowing the PWM command generation section 1012 to carry out the table search easily.

The PWM command output section 1013 counts the number of initiations of the interrupt control section 101, e.g., in the case of 4-column PWM command sets in Table 1 counts the number with a modular of 4, and reads out one of the PWM command sets depending on the count from the PWM command set memory 1015 to the device operating signal generation circuit 11. In this way, a PWM signal which is higher in resolution than a PWM signal which would be generated directly by the device operating signal generation circuit 11 is produced, and accordingly the servo motor is controlled more accurately.

Figure 3:
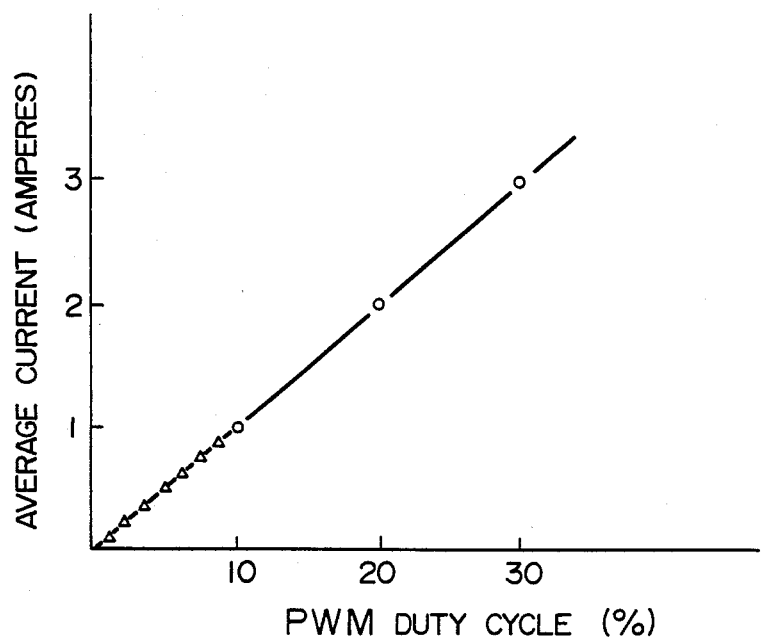
FIG. 3 is a graph used to explain the characteristics of the inventive control system in contrast with the conventional one.

Next, the motor current controls implemented by the embodiment of this invention and by the conventional system will be described with reference to FIG. 3. In the graph of FIG. 3, the average motor current is plotted on the vertical axis against the duty cycle (%) of the PWM signal, i.e., $t_p/T_p$ in formula (1), on the horizontal axis. The characteristic graph shows that the average motor current can be controlled in proportion to the duty cycle of PWM signal. As shown in the graph, the conventoinal driver stage control system allows only current values marked by symbol "o", lacking in the resolution in the small current section used in the final phase of positioning control. In contrast, marked by symbol "Δ" are current values allowed by that combination output of inventive PWM command, and the inventive system can control the motor current finely when it is required.

Figure 4:
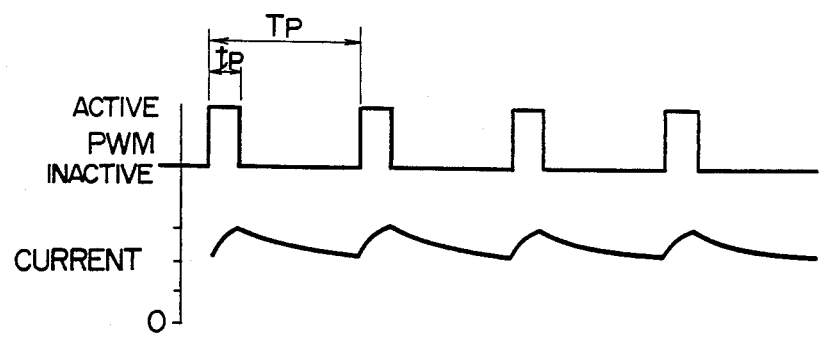
FIGS. 4, 5, 6 and 7 are waveform diagrams showing examples of current control achieved by the present invention.
Figure 5:
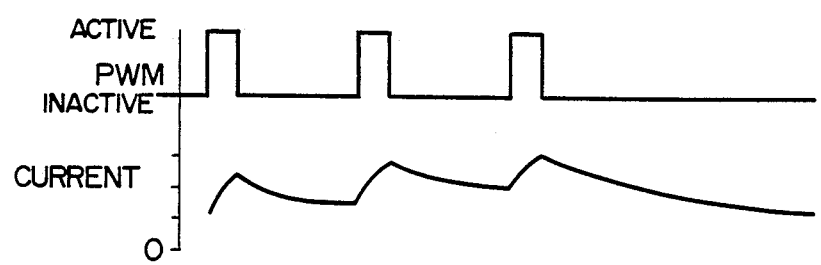
Figure 6:
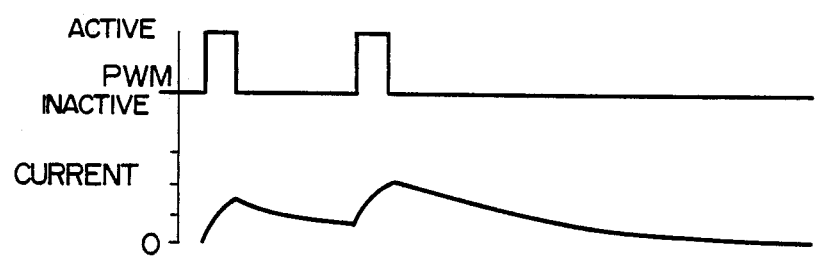
Figure 7:
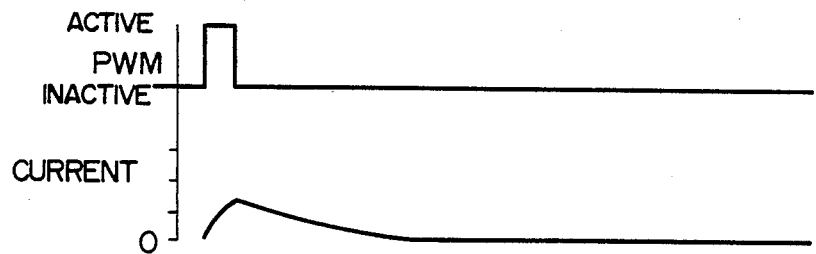

The reason for the favorable control characteristics of the present invention as shown in FIG. 3 is explained by the motor current with the assumption of $T_P = T_S$ in FIGS. 4 through 7. FIG. 4 is the case of the smallest PWM command applied continuously, and a relatively large current, although it is pulsative, flows continuously. This case corresponds to the conventional drive system. FIG. 5 is the case where every fourth PWM pulse is absent, and the current level falls as compared with FIG. 4. FIGS. 6 and 7 are the cases where two PWM pulses or three PWM pulses, respectively, in four PWM periods are absent. The current level becomes lower in the ascending order of these figures. Although the actual current waveform will somewhat differ from those shown in FIGS. 4 through 7 because of $T_S$ being incomparably greater than $T_p$ in practice, the property of the present invention will be appreciated.

In the above embodiment of the invention, the PWM command output section does not need to be located at the position in accord with the operational sequence as described above, but it can be placed at an arbitrary location such as the position which is executed immediately after the interrupt control section has initiated.

An alternative disposition is as follows. The interrupt control section 101 includes a manual operation signal input section and display operation section, although they are not shown in the figure. A first PWM command output section is placed at the top of the interrupt control section 101 and, in consideration of the operation time expended by the overall interrupt control section 101, a second PWM command output section is placed at the position which is executed about half the interrupt control activation period $T_S$ after the operation of the first PWM command output section.

Finally, another example of forming a table will be described. Table 1 as shown previously is a complete table. It is also possible to create a table with the intended PWM value having an integer part thereof of "0" so that the value of the other part is modified using the integer part of the intended PWM value. This scheme reduces the capacity of the table significantly, saving a significant amount of memory space.

A further example is that when high-resolution PWM is needed only at the position control of the servo motor, the above-mentioned table with the intended PWM value having a "0" integer part suffices the purpose, and for an intended PWM value with a "non-zero" integer part, a PWM command set can be produced directly from the integer part (each value of the command set is equal to the value of the integer part). Since PWM is not required to be high-resolution for an intended PWM values with a non-zero integer part, it is not necessary to produce a PWM command set and output PWM commands separately. Such situation can easily be handled by slightly modifying the algorithm of the PWM command output section.

In case a single microcomputer is use to control a plurality of servo motors concurrently, as seen in an industrial robot having several joints, the interrupt control section 101 with the ability of executing the control operation for only one servo motor at one interrupt initiation is designed to control all servo motors sequentially and cyclically using the interrupt operation a plurality of times. The application of this invention with the above-mentioned cyclic characteristic will provide a further satisfactory result.

According to the above embodiment of this invention, as described above, when PWM is required to be high-resolution, minimum PWM commands which the power control device operating signal generation circuit 11 can produce and the PWM commands which deactivate the power control devices A and B are combined in a plurality of sets so that the control command device provides an average value of the intended resolution, and each PWM command is delivered to the device operating signal generation circuit sequentially at a certain interval over a plurality of periods, whereby the following advantages are attained.

An increased resolution of PWM command is accomplished using a control command device which is allowed to have an operation time of the order of several hundred microseconds to milliseconds as compared with the power control device operating signal generation means which is required to have a high-speed operation of the order of microseconds or faster, whereby difficulties in the circuit technology can be avoided.

In case the control command device is realized by a microcomputer, the present invention is practiced on a software basis without an increase in the manufacturing cost as compared with the conventional system.

Since the PWM signal is not required to be high-resolution, an elaborate circuit technique and control technique are not necessary, and high-accuracy position control and speed control can be accomplished by PWM control with relatively low resolution.

Next, the arrangement and operation of the power control device operating signal generation circuit 11 will be described in further detail with reference to FIGS. 9 and 10.

Figure 9:
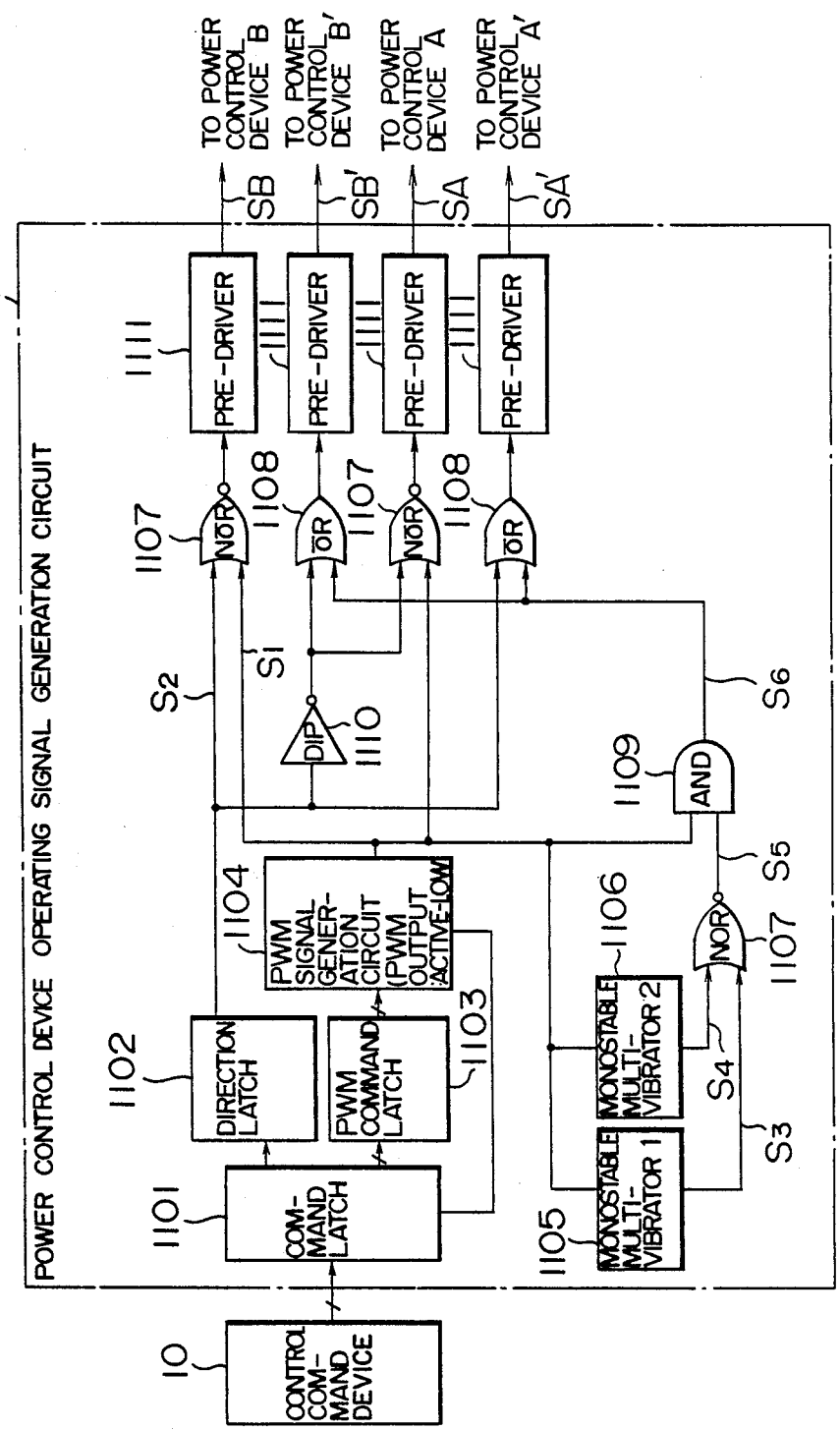
FIG. 9 is a block diagram of the power control device operating signal generation circuit in the system shown in FIG. 1.

The power control device operating signal generation circuit 11 shown in FIG. 9 consists of a command latch 1101 which holds the direction and PWM command signals issued by the control command device 10 at a constant interval $T_S$, a PWM command latch 1103, e.g., made of a counter, which receives the PWM command from the command latch 1101 in response to the signal provided by a PWM signal generation circuit 1104 at a constant interval $T_p$, a direction latch 1102 made of a similar data holding, the PWM signal generation circuit 1104 which produces an active-low PWM signal with a downward convex waveform in accordance with the information in the PWM latch 1103, a monostable multivibrator 1105 which responds to the falling edge of the PWM signal to produce an active-low pulse signal having a width slightly narrower than the PWM signal period $T_p$, a monostable multivibrator 1106 which responds to the rising edge of the PWM signal to produce an active-high, short-period pulse signal with a downward convex waveform, a NOR gates 1107, OR gates 1108, an AND gate 1109, an inverter 1110, and pre-drivers 1111 which amplify their input signals to power control device drive signals.

The operation of the power control device operating signal generation circuit 11 is as follows. The direction latch 1102 operates to hold the direction command which has been held in the command latch 1101 at the interval $T_p$ and release the signal as signal S2 shown in FIG. 10. The PWM signal generation circuit 1104 produces an active-low PWM signal S1, shown in FIG. 10, in a phase relationship slightly delayed from the signal S2, based on the information held in the PWM command latch 1103 at the interval $T_P$. For the signal S1 shown in FIG. 10, portions drawn by the dashed line are the case where the PWM signal is completely inactive within the period $T_P$ and does not supply a current or voltage to the servo motor at all.

The monostable multivibrator 1105 responds to the falling edge of the PWM signal S1 to produce a signal S3 shown in FIG. 10. The monostable multivibrator 1106 responds to the rising edge of the PWM signal S1 to produce a signal S4 shown in FIG. 10. The signals S3 and S4 are joined by the NOR gate 1107 to become a signal S5, which in turn is joined with the PWM signal S1 by the AND gate 1109 to become a signal S6. The signal S1 is an original drive signal for the power control devices A and B shown in FIG. 8, and the signal S6 is an original drive signal for the power control devices A' and B' shown in FIG. 8. These signals S1 and S6 are joined with the direction signal S2 by the OR gates 1108 and NOR gates 1107, and amplified by the pre-drivers 1111 to become signals SB, SB', SA and SA' for driving the power control devices B, B', A and A', respectively, in FIG. 8. Consequently, one of the signals for driving the devices A' and B' becomes active depending on the direction signal S2 irrespective of the state of the PWM signal S1, and activates the corresponding device. Specifically, when the PWM signal is changing its state, an active direction signal S2 makes the device A' active invariably, and the devices A and B are PWM-controlled so that they do not short-circuit due to overlapping active periods. Conversely, an inactive direction signal S2 makes the device B' active invariably, and the devices B and A' are PWM-controlled.

With the PWM signal in the state shown by the dashed line, an active direction signal S2 makes only the device A' active invariably, with the remaining devices A, B and B' being left deactivated, while an inactive direction signal makes the device B' active invariably with the remaining devices A, B and A' being left deactivated.

Next, application of a braking current to the d.c. servo motor will be described, for the case of an active direction signal S2, with reference to FIGS. 8 and 10. When the PWM signal S1 is active, a current flows in the circuit including the device A, servo motor 14 and back to device A. If a braking current is flowing, it is diminished sharply by this circuit formation. At the moment when the PWM signal S1 has become inactive, the device B' is still deactivated and a motor drive current, if it exists, decreases in the circuit formation including the diode BD, servo motor 14 and to the device A'. If a braking current is flowing, a circuit including the diode AD, servo motor 14 and back to the diode AD is formed, causing the braking current to decrease sharply. Accordingly, when the device B is activated with a delay to form a circuit including the diode AD, servo motor 14 and to the device B', the braking current is already too small to provide an effective braking torque. In this situation, by switching the direction signal reversely and the PWM signal to carry a deactivation command, a circuit including the diode AD, servo motor 14 and to the device B is formed, and a sufficient braking current can be produced.

Next, the operation of the control command device 10 will be described in detail with reference to FIG. 7 and Tables 2 and 3. In this embodiment, the control command device 10 is a logical operation unit, specifically a microcomputer, and control logic is realized on a software basis.

The control command device 10 consists of a main control section 100 and an interrupt control section 101, which includes a control operation section 1011, PWM command generation section 1012, PWM command output section 1013, PWM command set table 1014, and PWM command set memory 1015, as shown in FIG. 2. The main control section 100 issues position and speed data and operation instructions for the servo motor 14 to the interrupt control section 101 in accordance with an instruction from a manual command unit or high-ranking controller (not shown).

The interrupt control section 101 is an interrupt program which is initiated at a constant interval $T_S$ in response to a reference timing signal from an internal timer of the microcomputer or from the outside. The interrupt control section 101 implements the instructions from the main control section 100. Specifically, the control operation section 1011 sets the target value of operation at the current time point in compliance with the operation instruction issued by the main control section 100, compares the setup value with the feedback signal provided by the feedback signal generation device 16, and calculates the intended PWM value for operating the servo motor 14 in accordance with a predetermined control algorithm.

The PWM command generation section 1012 receives the intended PWM value, retrieves a PWM command set including direction information from the PWM command set table 1014, as shown in Tables 2 and 3, depending on the current motor rotational direction, and stores it in the PWM command set memory 1015. Examples of the intended PWM value and PWM command set are as shown in Table 2 and Table 3.

TABLE 2

For positive motor speeds:

| Intended PWM value | PWM command set | | | |
|---|---|---|---|---|
| ∫ | (Direction & PWM command) ∫ | ∫ | ∫ | ∫ |
| 2.0 | (0.2) | (0.2) | (0.2) | (0.2) |
| 1.3 | (0.2) | (0.2) | (0.2) | (0.1) |
| 1.2 | (0.2) | (0.2) | (0.1) | (0.1) |
| 1.1 | (0.2) | (0.1) | (0.1) | (0.1) |
| 1.0 | (0.1) | (0.1) | (0.1) | (0.1) |
| 0.3 | (0.1) | (0.1) | (0.1) | (1.0) |
| 0.2 | (0.1) | (0.1) | (1.0) | (1.0) |
| 0.1 | (0.1) | (1.0) | (1.0) | (1.0) |
| 0.0 | (1.0) | (1.0) | (1.0) | (1.0) |
| −0.1 | (1.1) | (1.0) | (1.0) | (1.0) |
| −0.2 | (1.1) | (1.1) | (1.0) | (1.0) |
| −0.3 | (1.1) | (1.1) | (1.1) | (1.0) |
| −1.0 | (1.1) | (1.1) | (1.1) | (1.1) |
| −1.1 | (1.2) | (1.1) | (1.1) | (1.1) |
| −1.2 | (1.2) | (1.2) | (1.1) | (1.1) |
| −1.3 | (1.2) | (1.2) | (1.2) | (1.1) |
| −2.0 | (1.2) | (1.2) | (1.2) | (1.2) |
| ∫ | ∫ | ∫ | ∫ | ∫ |

TABLE 3

For negative motor speeds:

| Intended PWM value | PWM command set | | | |
|---|---|---|---|---|
| ∫ | (Direction & PWM command) ∫ | ∫ | ∫ | ∫ |
| 2.0 | (0.2) | (0.2) | (0.2) | (0.2) |
| 1.3 | (0.2) | (0.2) | (0.2) | (0.1) |
| 1.2 | (0.2) | (0.2) | (0.1) | (0.1) |
| 1.1 | (0.2) | (0.1) | (0.1) | (0.1) |
| 1.0 | (0.1) | (0.1) | (0.1) | (0.1) |
| 0.3 | (0.0) | (0.1) | (0.1) | (0.0) |
| 0.2 | (0.1) | (0.1) | (0.0) | (0.0) |
| 0.1 | (0.1) | (0.0) | (0.0) | (0.0) |
| 0.0 | (0.0) | (0.0) | (0.0) | (0.0) |
| −0.1 | (1.1) | (0.0) | (0.0) | (0.0) |
| −0.2 | (1.1) | (1.1) | (0.0) | (0.0) |
| −0.3 | (1.1) | (1.1) | (1.1) | (0.0) |
| −1.0 | (1.1) | (1.1) | (1.1) | (1.1) |
| −1.1 | (1.2) | (1.1) | (1.1) | (1.1) |
| −1.2 | (1.2) | (1.2) | (1.1) | (1.1) |
| −1.3 | (1.2) | (1.2) | (1.2) | (1.1) |
| −2.0 | (1.2) | (1.2) | (1.2) | (1.2) |

In tables 2 and 3, the intended PWM value has an integer part which represents a PWM signal that the power control device operating signal generation circuit 11 can produce, i.e., a normalized value corresponding to the active period $t_p$ of the PWM signal in formula (1), a sign which represents the direction, and a fractional part which represents the enhanced portion of PWM resolution. The PWM command sets in Tables 2 and 3 are part of the table in the case of four-fold enhancement of resolution, and one command set is made up of four commands. Each command has two sections separated by a comma, the former being a direction command and the latter being a PWM command which the power control operating signal generation circuit 11 can produce, i.e., a normalized value corresponding to $t_p$ in formula (1). The PWM signal with zero value is the inactive command over the entire period of PWM signal, i.e., the command for cutting off the current supply to the servo motor 14.

As described previously, with the intention of allowing only a braking current of the servo motor 14 to flow by combining this condition with the direction command, there are provided two PWM command set tables (Table 2 and Table 3) which are selected depending on the polarity of the current motor rotational speed. By this arrangement of tables, the intended PWM value directly indicates the table address of a PWM command set to be searched adapted to the current motor rotational direction, thereby allowing the PWM command generation section 1012 to make a table search easily.

Figure 8:
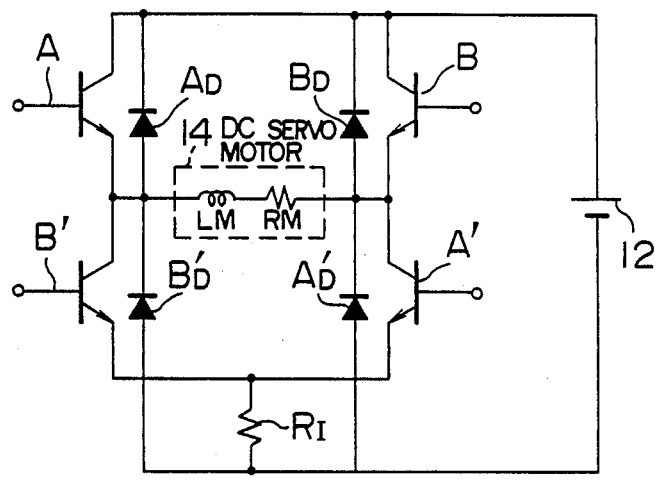
FIG. 8 is a schematic diagram of the conventional H-bridge driver stage for a servo motor.

The PWM command output section 1013 counts the number of initiations of the interrupt control section with a modular of 4 in the example of FIG. 8 to extract one of PWM command values depending on the count from the PWM command set memory 1015, and delivers it to the power control device operating signal generation circuit 11. In this way, a PWM signal having a higher resolution than a PWM signal which the device operating signal generation circuit 11 can produce is produced, resulting in a fine control for both the driving current and braking current, whereby the servo motor 14 is controlled accurately.

The advantages of the foregoing embodiment of the present invention are as follows.

For an inactive PWM command over the entire PWM period, i.e., the command for cutting off completely the current supply to the servo motor 14, the device operating signal generation circuit 11 is designed to produce a drive signal which activates only one of the devices on the ground side depending on the direction command, whereby a necessary braking current can be produced regardless of the circuit condition through an appropriate commanding method for the device operating signal generation circuit.

In case the driving current and braking current need to be controlled accurately, i.e., when PWM is required to be high-resolution, the control command device 10 is designed to combine the minimum PWM command which the device operating signal generation circuit 11 can produce and the PWM command for deactivating the devices A and B and allowing only a braking current to flow, in a plurality of sets so that the averaged value has the intended resolution, and to deliver each PWM command at a constant interval over a plurality of periods sequentially to the device operating signal generation circuit 11, whereby an increased resolution of PWM control can be achieved by the function of the control command device 10 which is allowed to have the operation time of the order of several hundred microseconds to milliseconds as compared with the device operating signal generation circuit which is required to have a high-speed operation of the order of microseconds or faster, and therefore difficulties in the circuit technique can be avoided.

In the case of the control command device 10 realized in a microcomputer, the present invention is practiced using software, and the manufacturing cost does not increase as compared with a convention system.

Since the PWM signal does not need to be high-resolution, elaborate circuit techniques and control techniques are not required, and yet high-accuracy position and speed control can be practiced by relatively low resolution PWM control.

Next, another embodiment of the present invention will be described.

The PWM command output sectoin 1013 described in connection with FIG. 2 does not always need to be located at a position based on the aforementioned operation sequence, but it may be located arbitrarily in such a position where it will be executed immediately after the interrupt control section has started.

A further arrangement for the PWM command output section is as follows. Generally, the interrupt control section 101 incorporates an input section for the manual operation input signals and a display operation processing section, although they are not shown. Accordingly, a first PWM command output section is placed at the top of the interrupt control section 101 and, in consideration of the operation time needed by the whole interrupt control section 101, a second PWM command output section is placed at a position such that about half the command interval $T_S$ of the interrupt control section has elapsed following the operation of the first PWM command section.

Next, another example of the table arrangement will be described. In contrast to Table 2 and Table 3 which are complete tables, another table arrangement is a table in which only intended PWM values with integer parts of ±0 (items 0.3 through −0.3 in Tables 2 and 3) are listed, while their fractional parts are produced by modification based on the integer part of the intended PWM value. This arrangement significantly reduces the table capacity, and considerable memory space can be saved.

As a further example, when high-resolution PWM is required only for the position control of the d.c. servo motor 14, a table containing the above-mentioned intended PWM values with "0" integer parts suffices for the control and for an intended PWM values with non-zero integer parts, a PWM command set (each command value is equal to the value of integer part) is produced directly from the integer part. Since in this case PWM is not required to be high-resolution for intended PWM values with non-zero integer parts, it is not necessary to produce a PWM command set and output the PWM command separately. Such a case can easily be dealt with by somewhat modifying the algorithm of the PWM command output section.

When the present invention is intended for use in the control of a servo mechanism having a plurality of joints such as an industrial robot or for the simultaneous control of several servo motors by use of a single microcomputer, the interrupt control section 101 is merely capable of control operation for one servo motor at each interrupt initiation due to its limited operational ability and is designed to control servo motors one at a time sequentially and cyclically using a plurality of interrupt operations, and therefore the application of this invention with its cyclic characteristic will achieve more satisfactory results.

According to this invention, as described above, there is provided a method of controlling the servo motor driver stage, which does not need high accuracy for the PWM signal and yet is capable of high-accuracy position control and speed control.

We claim:

1. A servo motor control apparatus comprising:
a driver stage which includes power control devices for driving a servo motor; power control device operating signal generation means which generates a pulse-width modulation (PWM) signal having a PWM frame interval time of $T_p$ for controlling said power control devices; and control command means which operates at a time interval of $T_S$ where $(T_S>>T_P)$ for providing a control command to said power control device operating signal generation means causing said power control device operating signal generation means to generate said pulse-width modulation signal, said control command being proportionally related to said pulse-width modulation signal, wherein said control command means comprises means for transforming a desired pulse-width modulation command value calculated in each time interval $T_S$ into a pulse-width modulation command set having a plurality of pulse-width modulation command values, and means for outputting a control command including said transformed pulse-width modulation command set sequentially to said power control device operating signal generation means at a constant time interval of T where $(T_S>T>T_P)$, and where $T_S=m.T$ (m is an integer number).

2. A servo motor control apparatus according to claim 1, wherein said transformed pulse-width modulation command set have a mean value which is equal to a pulse-width modulation command value calculated in each time interval $T_S$.

3. A servo motor control apparatus according to claim 1, wherein said transformed pulse-width modulation command set is delivered to said power control device operating signal generating means at a constant time interval of T where $(T_S>T>T_P)$ and where $T_S=m.T$ (m is an integer number).

4. A servo motor control apparatus according to claim 1, wherein said control command means provides a control command by comparing a feedback signal provided by a feedback signal generation means associated with said servo motor to a target pulse-width modulation command value.

5. A servo motor control apparatus comprising:
a driver stage which includes power control devices for driving a servo motor; power control device operating signal generation means which generates a pulse-width modulation (PWM) signal having a PWM frame interval time of $T_P$ for controlling said power control devices; and control command means which operates at a time interval of $T_S$ $(T_S>>T_P)$ and provides a control command to said power control device operating signal generation means causing said power control device operating signal generation means to generate said pulse width modulation signal, said control command being proportionally selected to said pulse width modulation signal, wherein said control command means comprises means for memorizing a plurality of sets of pulse-width modulation command values each set corresponding to a pulse-width modulation command value, means for retrieving from said memorizing means a set of pulse-width modulation command values corresponding to a desired pulse-width modulation command value calculated in each time interval $T_S$, and means for outputting the retrieved set of pulse-width modulation command values as said control command to said power control device operating signal generation means.

6. A servo motor control apparatus according to claim 5, wherein said retrieved set of pulse-width modulation command values are delivered to said power control device operating signal generation means at a constant time interval T where $(T_S>T>T_P)$ and where $T_S=m.T$ (m is an integer number).

7. A servo motor control apparatus according to claim 5, wherein said control command means provides control command values by comparing a feedback signal provided by a feedback signal generation means associated to said servo motor with a target pulse-width modulation command value.

8. A servo motor control apparatus comprising: a driver stage which includes power control devices in a paired configuration for driving a servo motor; power control device operating signal generation means which generates a pulse-width modulation (PWM) signal having a PWM frame interval time or $T_P$ for controlling said power control devices; and control command means which operates at a time interval of $T_S$ where ($T_S$>>$T_P$) and provides a control command to said power control device operating signal generation means causing said power control device operating signal generating means to generate said pulse width modulation signal, said control command being proportionally related to said pulse width modulation signal wherein said control command means comprises an interrupt control section which provides a motor drive direction command to said power control device operating signal generation means in each time interval $T_S$, said power control device operating signal generation means receives said direction command at a constant time interval of T where ($T_S$>T>$T_P$), said constant time interval of T being controlled by said interrupt control section and provides a drive signal which activates one of said power control devices located on the ground side of said driver stage based on a predetermined control algorithm.

9. A servo motor control apparatus according to claim 8, wherein said power control device operating signal generation means provides a drive signal which activates only a power control device that operates in accordance with said direction signal when said control command output by said control command means is inactive over the entirety of said constant time interval of T where ($T_S$>T>$T_P$) and where $T_S$=m.T (m is an integer number).

10. A servo motor control method comprising the steps of determining a pulse-width modulation command value used to drive a servo motor in each time interval of $T_S$, dividing said pulse-width modulation command value into a plurality of pulse-width modulation command values, and outputting said pulse-width modulation command values to power control device operating signal generation means which generates a pulse-width modulation (PWM) signal having a PWM frame interval time of $T_P$ for controlling, at a constant time interval or T where ($T_S$>T>$T_P$) and where $T_S$=m.T (m is an integer number), power control devices which drives said servo motor.

* * * * *